INVENTOR
C. E. GERMANTON
BY [signature]
ATTORNEY

3,328,538
OPERATOR SERVICE INDICATOR AND CHECK CIRCUIT

Charles E. Germanton, Summit, N.J., assignor to Bell Telephone Laboratories, Incorporated, New York, N.Y., a corporation of New York Filed Feb. 24, 1964, Ser. No. 346,919
14 Claims. (Cl. 179—175.2)

Figure 1:
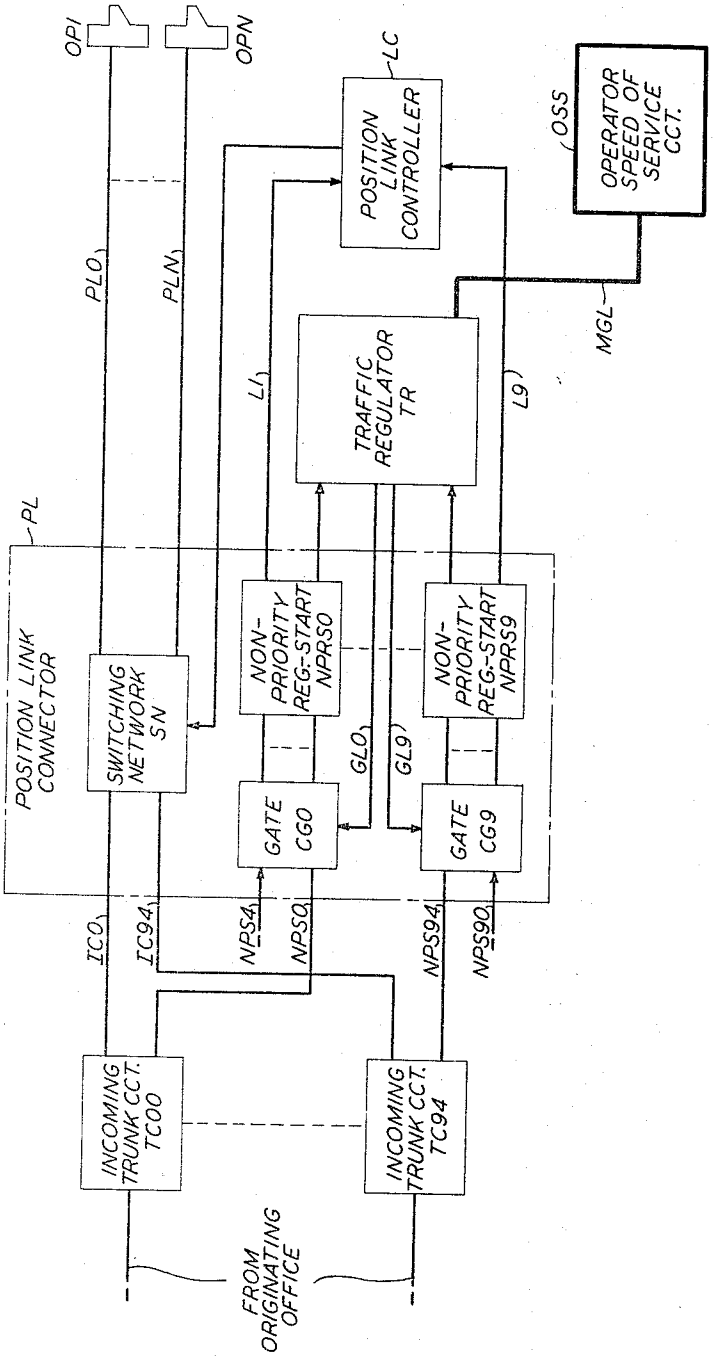

This invention relates to operator service circuits for switching systems and particularly to circuits which measure the speed with which telephone operators serve calls and which thereafter supply indications concerning the measured speed-of-service. My invention further relates to circuits that provide accurate speed-of-service indications which aid telephone personnel in determining the number of operators needed for promptly serving calls requiring operator assistance for their completion.

Telephone companies often incorporate automatic equipment into their switching systems for obtaining information which aids their personnel in determining whether an adequate number of operators is available for promptly serving incoming calls. A system having such equipment is disclosed in my United States Patent No. 2,883,471 of Apr. 21, 1959. The latter equipment includes a calls-waiting circuit which has a meter (FIG. 138) for portraying information concerning the relationship between the number of operators employed in the system and the number of incoming calls currently waiting for operator assistance.

In certain instances, the information furnished by such prior art equipment has proven insufficient for enabling telephone personnel to ascertain whether an adequate number of operators is presently employed in the system for serving the current incoming calls. The information has proven insufficient because it does not include any direct indication of the speed with which the operators serve such calls. Without such indications, telephone personnel are unaware of the approximate delays which customers encounter before they obtain the needed assistance. Accordingly, the personnel are deprived of one of the fundamental statistics needed for properly determining the adequacy of the number of operators employed in a telephone system. Moreover, it is known that telephone personnel, who are unaware of the delay or the operator speed-of-service, often erroneously conclude that fewer or additional operators are required for promptly serving the incoming calls currently needing assistance for their completion. In view of the foregoing, it is apparent that a need exists for a means which supplies telephone personnel with accurate indications concerning the speed with which operators serve calls and which thereby enables them to determine the number of operators needed for promptly serving incoming calls.

Accordingly, it is an object of my invention to provide improved facilities for enabling telephone personnel to estimate more accurately the number of operators needed for promptly serving calls requiring operator assistance for their completion.

It is another object of this invention to provide economical and reliable equipment which measures the speed with which operators serve calls and which supplies accurate indications concerning the measured speed-of-service.

These and other objects are attained in accordance with an exemplary embodiment of my invention wherein circuits are provided in an existing telephone system for measuring and indicating the speed with which telephone calls are connected from incoming trunk circuits through a position link connector to operator positions for service. In accordance with the existing telephone system, a traffic regulator is provided for opening a plurality of gates to admit calling trunk circuits into the position link connector for connection to the operator positions. After these circuits have been admitted, the regulator temporarily closes the gates to block the admission of other trunk circuits into the position link connector until after all of the previously admitted circuits have been connected to the positions.

I have found that the frequency with which the regulator opens and closes the gates within a timed interval is representative of the speed with which the operators are serving calls. Accordingly, the exemplary embodiment of my invention includes timer and counter circuits which measure the speed with which operators serve calls by generating a timed interval and by counting the number of times that the regulator opens and closes the gates within the generater interval. After the timed interval has elapsed, a control circuit is activated by the counter to energize an indicator lamp to one of three states, namely, flashing, steadily lighted or dark. These states of the lamp indicate that the operator speed-of-service is slow, satisfactory or faster than needed, respectively.

The timer circuit is activated in accordance with my invention to commence timing whenever a trunk circuit is admitted into the position link connector and to continue timing toward the end of the timing period as long as an admitted trunk is awaiting connection to an operator position. At the expiration of the timed interval, the timer cooperates with the counter circuit to activate the lamp control circuit for energizing the indicator lamp to that of its three states corresponding to the measurement. Thereafter, the timer may recycle to prepare for a subsequent measurement. Another aspect of the timer is that whenever none of the trunks circuits is awaiting connection to a position, the timer is deactivated and thereupon operates the lamp control circuit to extinguish the indicator lamp. The darkness of the lamp signifies that the speed-of-service is better than required at that time.

According to the exemplary embodiment of my invention, the counter is activated by pulses received from the traffic regulator. Each such pulse corresponds to one opening and closing of the aforementioned gates. The counter is designed to count in three stages each of which has an output that corresponds both to a distinct range of counted gate openings and closings and to one of the three speeds-of-service indicated by the indicator lamp. Two of the three outputs of the counter are individually associated with a register relay which is activated by the counter when the count reaches the range of the associated stage. Upon operating, the relay is locked-operated either until after the indicator lamp is energized at the end of the timed interval to the state corresponding to the counted number of gate openings and closings, or until the timing interval is terminated when none of the trunk circuits is awaiting a connection to an operator position.

The lamp control circuit is arranged to cooperate with the timer and counter circuits to activate the lamp to each of its three states. In addition, the control circuit includes facilities for checking that the indicator lamp is actually lighted to the state which corresponds to the measurement. Apparatus is also included in the control circuit for resetting the timer and counter circuits after the indicator lamp has been energized following a measurement.

Three relays are included in the control circuit and each one is operable under joint control of the timer and the counter at the end of the timing interval to energize the lamp to one of its three states. A symmetric configuration of contacts on these relays is used to check that the lamp is actually lighted to the state which corresponds to the current measurement. It performs this check by releasing that one of the three relays which is operated due to the immediately preceding measurement and by thereafter allowing the appropriate other one of them to be locked-operated either until after the next measurement or until none of the trunk circuits is awaiting connection to an operator position. This contact symmetric also activates a reset relay in the control circuit immediately following the aforementioned check in order to reset the timer and counter for a subsequent measurement.

As disclosed in the illustrative embodiment, my invention also includes an alarm circuit which is activated to give a visual alarm whenever a trouble occurs in the timer, counter or control circuit. The alarm circuit is particularly arranged to detect troubles arising upon the checks performed by the aforementioned contact symmetric.

A feature of my invention is the provision of circuits which automatically measure the speed with which an operator serves calls within a timed interval and which thereafter supply indications corresponding to the measured speed-of-service.

It is another feature of this invention that the measuring and indicating circuits include a timer which generates a timed interval, a counter which counts the number of times that calling circuits are admitted into a switching network for connection to an operator position, and a control circuit which is activated by the counter and the timer at the end of the timed interval for supplying a distinct indication which corresponds to both the counted number and an operator speed-of-service.

A further feature is the provision of checking facilities in the control circuit for insuring that each of the supplied indications correspond to the measurement.

Yet another feature is that the timer includes apparatus for commencing the timing interval whenever a calling circuit is admitted into the switching network, apparatus for continuing the timing toward the end of the interval as long as such a circuit is awaiting connection to a position, and apparatus for both arresting the timing when no such circuit is awaiting connection to a position and activating the control circuit to provide an indication signifying that the operator speed-of-service is better than needed.

Still another feature is the provision of a single lamp for providing a plurality of different illumination states each of which corresponds to a distinct operator speed-of-service, and apparatus in the control circuit for activating the lamp to the different states in accordance with the number of calling circuit admissions counted by the counter.

Another feature is that the apparatus of the control circuit includes a first device and an interrupter for lighting the lamp at a flashing rate to indicate a slow speed-of-service, a second device for steadily lighting the lamp to indicate that the speed-of-service is satisfactory, and another device for placing the lamp in its dark state to indicate that the speed-of-service is better than needed by the present volume of call traffic.

Still another feature is that each of the aforementioned devices comprises a relay having contacts in a symmetric configuration for checking that the lamp is actually energized to the state corresponding to the current measurement.

An advantage of my invention over prior art equipment is that it enables telephone personnel to be aware of whether customers encounter permissive or prolonged delays before they obtain the needed operator assistance. The awareness of the delays in terms of operator speed-of-service permits the personnel to estimate better the adequacy of the number of operators serving the system.

Figure 2:
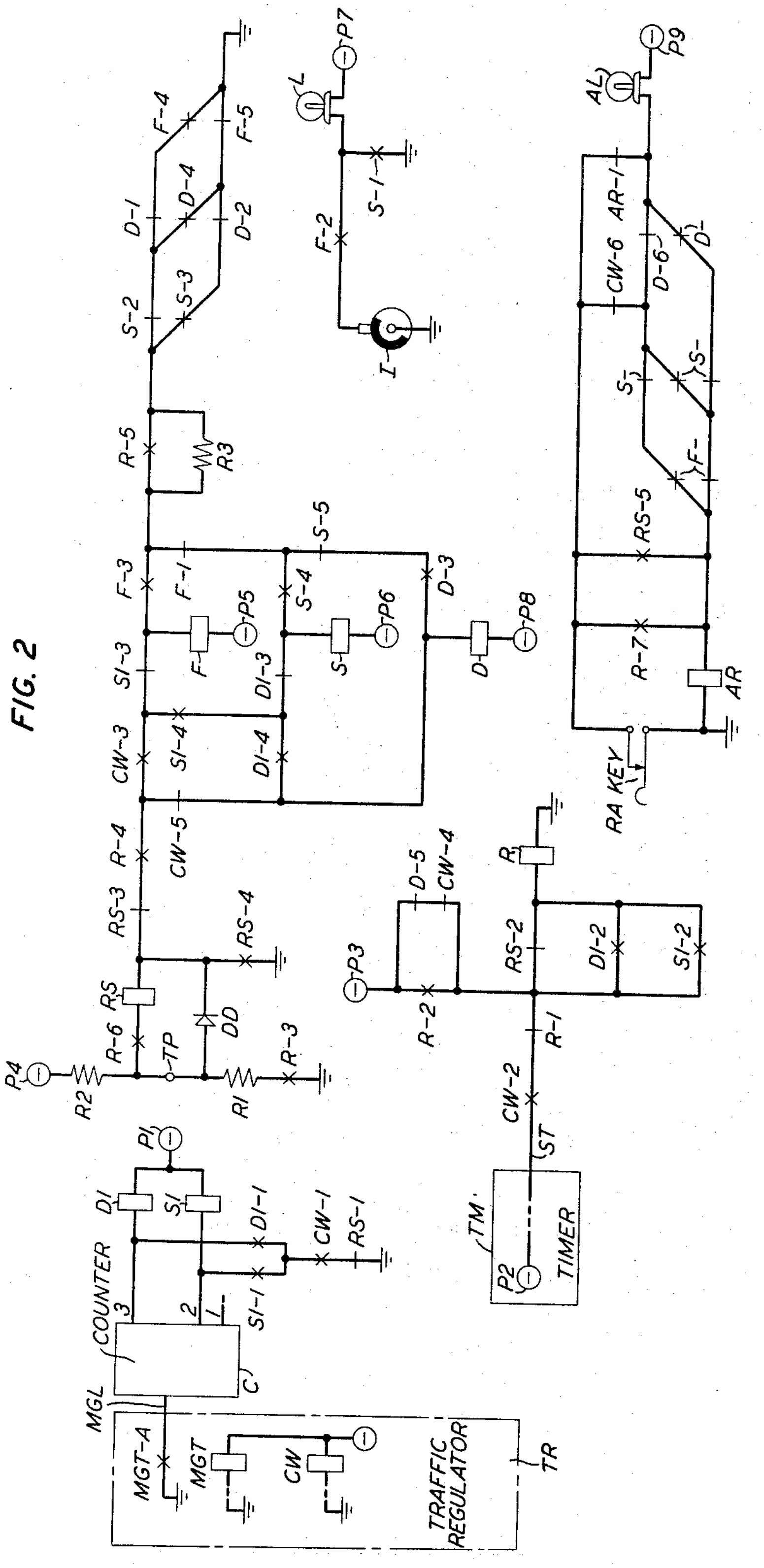

A complete understanding of the foregoing and other advantages and features of my invention may be gained from consideration of the following description, together with the accompanying drawing, in which:

FIG. 1 is a block diagram showing in heavy lines the connection of the operator speed-of-service circuit to prior art switching equipment comprising a position link connector which is used for interconnecting incoming trunk circuits with operator positions under the control of a position link controller and a traffic regulator; and FIG. 2 is a schematic representation of a specific illustrative embodiment of my invention which may be incorporated into the traffic regulator and the operator speed-of-service circuit of FIG. 1.

It is noted that FIG. 2 employs a type of schematic notation referred to as "detached-contact" in which an X crossing a line represents a normally opened contact of a relay and a bar crossing a line represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers (AIEE) Transactions, Communications and Electronics, vol. 74, pages 505–513.

Referring now to FIG. 2, it is noted that the counter C and the timer TM are each shown in block diagram form because the internal structural details of these devices form no part of the present invention and because many electronic and electromechanical designs for such devices are well known in the art. For example, the counter C may be of an electromechanical design in accordance with principles as set forth in the book Keister, Ritchie, Washburn, "The Design of Switching Circuits," Chapter 11, dated March 1956. Similarly, the timer TM may be a gas tube timer in accordance with principles as set forth in Chapter 17 of the latter reference.

Turning now to FIG. 1, the operator speed-of-service circuit is shown associated with equipment of an existing tandem telephone system of the design disclosed in my earlier United States patent application Ser. No. 318,427, filed Oct. 23, 1963 now Patent No. 3,297,829. The latter application, together with the other references cited therein, describes the construction and circuit operations of the position link connector PL, position link controller LG, the operator positions OP1–OPN, and the traffic regulator TR.

It may be seen in FIG. 1 that the position link connector PL and the position link controller LC together provide the facilities for interconnecting the incoming trunk circuits TC00–TC94 with the operator positions OP1–OPN over the leads of cables IC0–IC94 and PL0–PLN. As disclosed in my earlier application, the position link PL comprises the switching network SN for performing the actual interconnecting function and the position link controller LC, as its name implies, controls the operations of the position link PL over leads L1–L9 in such a fashion that all calling ones of the trunk circuits TC00–TC94 are interconnected with positions OP1–OPN on an equitable basis.

Fifty incoming trunk circuits are included in those designated TC00–TC94 and these circuits are segregated into 10 groups of five each and each such group may serve a different class-of-call in a manner as disclosed in my earlier application. Each of the trunk circuits TC00–TC94 is equipped with an individual one of the start leads NPS0–NPS94 for requesting connections through the position link connector PL to one of the positions OP1–OPN when operator assistance is required for a cell received from an originating telephone office.

The position link connector PL includes individual nonpriority register-start circuits NPRS0–NPRS9 of FIG. 1 for each of the trunk groups. These register-start circuits register the service connection requests received from the associated 50 trunk circuits and, in turn, apply start signals to both the position link controller LC and the traffic regulator TR. The requests are received by the position link connector PL from the trunk circuits over the NPS leads and are applied to the register-start circuits NPRS0–NPRS9 through individual control gates CG0–CG9. Each of these gates is controlled by the traffic regulator TR in order to insure that incoming calls received by the trunk circuits TC00–TC94 are served in the approximate order in which they are presented for service.

As disclosed in my aforementioned application, the regulator TR comprises a calls-waiting and master gate control circuit (not shown in detail in the present disclosure) for opening the gates CG0–CG9 of FIG. 1 to admit into the associated register-start circuits NPRS0–NPRS9 those service requests concurrently received from the trunk circuits TC00–TC94. After such requests have been admitted and registered in the circuits NPRS0–NPRS9, the latter circuits activate the calls-waiting and master gate control circuit of the regulator TR which thereupon applies signals to the leads GL0–GL9 for closing the appropriate ones of the gates CG0–CG9 to lock-out temporarily from the position link connector PL all other of the incoming trunk circuits in the same class-of-call trunk group as the trunk circuits which have already registered requests and which may subsequently request connections to the positions OP1–OPN. This insures that all incoming calls requesting the same class-of-service are connected through the position link connector PL in the approximate order in which they are received at the tandem office.

After one of the register-start circuits NPRS0–NPRS9 has registered a service request and one of the positions OP1–OPN has been found available for serving the request in a manner as set forth in my aforementioned application, the position link controller is activated over the appropriate leads L1–L9 for controlling the connection of each of the requesting trunk circuits having a registered request through the network SN to an available one of the positions OP1–OPN for service. When each such trunk circuit has been connected to one of the positions OP1–OPN, the calls-waiting and master gate control circuit of the traffic regulator TR may be activated again to open the gates CG0–CG9 of FIG. 1 to admit service requests into the register-start circuits NPRS0–NPRS9 from other of the trunk circuits TC00–TC94 having calls awaiting service.

As previously stated, I have found that the frequency with which the traffic regulator TR opens and closes the gates CG0–CG9 within a prescribed interval is dependent upon the speed with which the operators serve calls. Accordingly, the operator speed-of-service circuit OSS in accordance with the exemplary embodiment of my invention is designed to measure the speed with which operators serve calls by generating a timed served interval and counting the number of times that the regulator TR opens and closes the gates CG0–CG9 within the generated interval. At the end of the interval, circuit OSS provides one of three lamp indications in accordance with the counted number of gate openings and closings to indicate that the speed-of-service is slow, satisfactory, or faster than needed. Circuit OSS also performs a check to ascertain that only one of the three indications is provided and that it corresponds to the counted number of gate operations.

Turning now to the left side of FIG. 2, it may be noted that the calls-waiting relay CW and the master gate relay MGT are employed in the traffic regulator TR. These relays are also shown as part of the calls-waiting and master gate control circuit in FIG. 3 of my aforementioned application. The CW relay is operated whenever one of the trunk circuits TC00–TC94 of FIG. 1 has registered a request in one of the register-start circuits NPRS0–NPRS9 and remains operated while any such trunk circuit is awaiting connections to one of the positions OP1–OPN after registering the request. Relay MGT is operated and released once for each cycle of the opening and closing of the gates CG0–CG9 of FIG. 1. In accordance with the present invention, an additional contact MGT–A has been provided on relay MGT and it is actuated once on each operate and release cycle of relay MGT for supplying ground pulses to the lead MGL.

In FIG. 2, the counter C is arranged to count the number of pulses applied to lead MGL within a timed interval generated by timer TM and thereafter to supply a ground potential to one of the output leads 1, 2 or 3. For a number of counted pulses within a first range, counter C supplies ground to lead 1 to represent that the speed-of-service is slow. When the counted number of pulses exceeds the first range and is within a second predetermined range, counter C supplies ground to lead 2 for completing the circuit through the winding of relay S1 to the negative potential P1 to operate relay S1. Upon operating, relay S1 locks through the contacts S1–1, CW–1 and RS–1 to ground. The operation of relay S1 signifies that the speed-of-service is satisfactory and accordingly that an adequate number of operators is serving the system. When the counted number of pulses exceeds the second range, counter C supplies ground to lead 3 to complete the circuit through the winding of relay D1 to potential P1 for operating relay D1. In operating, relay D1 locks through the contacts D1–1, CW–1 and RS–1 to ground. The operation of relay D1 signifies that the speed-of-service is better than required because too many operators are serving the system.

The timer TM of FIG. 2 is activated to begin the generation of a timed interval upon the operation of relay CW. At that time, ground is applied through the winding of relay R and the contacts RS–2, R–1 and CW–2 to the start timing lead ST for activating timer TM. Thereafter, timer TM remains activated to continue the generation of the timed interval as long as relay CW remains operated to signify that at least one of the trunk circuits TC00–TC94 of FIG. 1 has registered a service request in one of the associated register-start circuits NPRS0–NPRS9 and is yet waiting for connections to one of the positions OP1–OPN. During the timing period, the relays D1 and S1 may be operated by the counter C, as previously explained, and thereby close the contacts D1–2 and S1–2 of FIG. 2 in parallel with contact RS–2 to prepare a locking path for relay R as described hereinafter.

If the volume of call traffic is sufficiently small and the last waiting trunk circuit is connected to a position before the end of the timed interval, relay CW is released and contact CW–2 is opened to deactivate timer TM for stopping further timing and enabling timer TM to prepare for generating the timed interval anew. When relay CW releases under such circumstances, it also opens the locking paths for relays D1 and S1 at contact CW–1 and these relays release if they had previously been operated during the timing interval. The counter C then recycles and no other action afterwards occurs in the circuits of FIG. 2 until relay CW again is operated.

However, in the event that any waiting trunk circuit has not been connected to one of the positions OP1–OPN before the expiration of the timed interval, the timer TM connects the negative potential P2 to lead ST for completing the circuit through the winding of relay R to operate it. In operating, relay R locks through contacts RS–2, D1–2 or S1–2 and R–2 to the negative potential P3. Shortly thereafter, relay R opens contact R–1 to deactivate the timer TM and thereby enable it to prepare for generating the timed interval anew. The operation of relay R also closes its contact R–3 to complete the circuit from ground through the voltage divider resistors R1 and R2 and terminal TP to the negative potential P4 for supplying a voltage at the terminal TP which is used for controlling the operation of relays D, F, S and RS of FIG. 2.

The lamp control circuit shown in FIG. 2 comprises the relays F, S and D. Relay F is operable for controlling the energization of the lamp L of FIG. 2 at flashing rate to indicate that the speed-of-service is slow. Relay S is operable under control of relay S1 and R for steadily lighting lamp L to indicate that the speed-of-service is satisfactory. Relay D is operable under control of relays S1, D1 and R for extinguishing lamp L and allowing its darkness to indicate that the speed-of-service is faster than is needed. The control circuit also comprises a one-only symmetric configuration of the contacts on relays D, F and S as shown at the upper right side of FIG. 2. This symmetric is used as part of the checking circuitry integrated into the circuits of FIG. 2 for checking that each of the indications provided by lamp L actually corresponds to the measurement. It preforms this function after one of the relays D, F or S is operated following a measurement. The symmetric first opens the locking path of that one of these relays which was locked-operated on the immediately preceding measurement and then locks-operated that one of them which is operated in connection with the immediate measurement but only if all of the others of these relays are released. In this manner, the indication provided by lamp L either actually corresponds to the present measurement or an alarm signal is given as hereinafter described. A reset relay RS of FIG. 2 is also used in the control circuit for releasing the operated ones of the D1, R and S1 relays after a satisfactory check has been made by the one-only symmetric and thereby prepares the timer TM and counter C for another measurement.

Let it be assumed now that the speed-of-answer during the last timed interval was slow as manifested by a low number of MGT relay operations during that interval and the grounding of the output terminal 1 of counter C as previously explained. Accordingly, when relay R operates at the end of the timing period, a circuit is completed for operating relay F of FIG. 2. This circuit is from the negative potential P5 through the F relay winding, contacts S1–3, CW–3, R–4 and RS–3, and diode DD to the voltage at terminal TP. In operating, relay F opens the locking paths of relays D and S at contact F–5 in the one-only contact symmetric for releasing that one of these relays which may have been lock-operated, as later explained, for a previous speed-of-service measurement.

It is advisable at this point to note that in the event relay D had been locked-operated for the previous measurement, the indicator lamp L of FIG. 2 would not be illuminated but would be dark to signify that the speed-of-service is better than required. However, if relay S had been lock-operated, the lamp L would have been energized over the path from the negative potential P7 through lamp L and contacts S–1 to ground for providing a steadily illuminated lamp signal which indicates that the speed-of-service is satisfactory. The latter lamp signal, however, would be withdrawn when relay S releases and opens contacts S–1 following the aforementioned operation of relay F. When relay F operates, it closes contact F–2 to connect the periodic ground pulses supplied by the interrupter I to lamp L for causing it to light at a flashing rate. This flashing of the lamp indicates to a telephone attendant that the speed-of-service is too slow and therefore unsatisfactory.

Following the operation of relay F and the release of relay D or S, as explained, relay F is locked-operated over the path through the contacts F–3, R–5, S–2, D–1 and F–4 to ground and, as a result, the flashing signal provided by lamp L is maintained until after the completion of the next measurement. In addition, relay RS is operated over the path from the voltage at terminal TP through contact R–6, the RS relay winding and the contacts RS–3, R–4, CW–3 and S1–3 to the locking ground supplied to the F relay winding. Upon operating, relay RS locks through contact RS–4 to ground. At the same time, relay RS effects the release of relay R by opening its locking path at contact RS–2. In releasing, relay R enables relay F to remain operated on a lower hold current by opening the shunt around the resistor R3 at contact R–5. Relay R also effects the release of relay RS by opening contact R–6. Upon the release of relay RS, contact RS–2 is reclosed to apply a ground signal to the timer TM via lead ST for initiating the generation of another timed interval if a trunk circuit is yet awaiting connections to an operator position.

Turning now to the case where the speed-of-service is satisfactory, it may be recalled that for such a situation the number of MGT relay operations counted by counter C during the timed interval is such that its output terminal 2 is grounded to operate relay S1. Therefore, when relay R operates, a circuit is completed for operating relay S of FIG. 2. This circuit is from the negative potential P6 through the S relay winding, contacts DI–3, SI–4, CW–3, R–4 and RS–3, and diode DD to the voltage at terminal TP.

The operation of relay S closes its contact S–1 to energize the lamp L to its steadily lighted state and thereby to notify the telephone attendant that the speed-of-service is satisfactory. At the same time, relay S opens contact S–2 of the symmetric, which is in the locking paths for relays D and F, for releasing that one of these relays which may have been operated for the immediately previous speed-of-service measurement. After the operation of relay S and the release of relay D or F, relay S is locked-operated over the path through the contacts S–4, F–1, R–5, S–3, D–2 and F–5 to ground. As a result, the steadily lighted signal furnished by lamp L is maintained until after the completion of the next measurement.

Shortly afterwards, relay RS is operated over the path from the voltage at terminal TP through contact R–6, the RS relay winding, and the contacts RS–3, R–4, CW–3, S1–4 and D1–3 to the locking ground supplied to the S relay winding. In operating, relay RS locks through contact RS–4 to ground. Operated relay RS also releases the the relays R and S1 by opening the contacts RS–2 and RS–1. The released relay R enables relay S to remain operated on a lower hold current by opening the shunt around resistor R–3 at contact R–5. In releasing, relay R also releases relay RS by opening contact R–6. The release of relay RS recloses contact RS–2 to apply a ground signal to the timer TM over lead ST and contacts R–1 and CW–2 for initiating the generation of another timed interval.

When the speed-of-service is better than needed, the number of MGT relay operations counted by counter C within the timed interval is sufficiently high so that its output terminals 2 and 3 are both grounded to operate relays D1 and S1. Hence, after relay R operates as hereinbefore described at the termination of the timing interval, relay D is operated over the path from the negative potential P8 through the D relay winding, contacts D1–4, S1–4, CW–3, R–4 and RS–3, and diode DD to the voltage supplied at terminal TP.

Upon operating, relay D opens its contacts D–1 and D–2 in the aforementioned locking paths for relays F and S for releasing that one of the latter relays which may have been operated for the immediately previous speed-of-service measurement. After the release of relay F or S, the lamp L is extinguished and its darkness indicates to the attendant that the speed-of-service is better than needed for the volume of call traffic. When relay F or S releases and relay D operates, relay D locks-operated over the path through contacts D–3, S–5, F–1, R–5, S–2, D–4 and F–5 to ground. Thereafter the lamp L is maintained in its dark state until after the completion of the next measurement.

At approximately the same time as relay D locks, relay RS is operated over the path from the voltage at terminal TP through contact R–6, the RS relay winding and the contacts RS–3, R–4, CW–3, S1–4 and D1–4 to the locking group supplied to the D relay winding. Upon operating, relay RS locks-operated through contact RS–4 to ground. Relay RS also releases relays D1, S1 and R by opening contacts RS–1 and RS–2. In releasing, relay R enables relay D to lock-operated on a lower hold current by opening the shunt around resistor R–3 at contact R–5.

Relay R also opens contact R–6 to release relay RS. The release of relay RS closes contacts RS–2 to apply the ground signal to lead ST for initiating the generation of another timed interval by timer TM.

According to other aspects of my invention, circuitry is provided for extinguishing the lamp L when it is either in the steadily lighted or flashing state and relay CW is released to signify that none of the trunk circuits TC00–TC94 is awaiting connection to the positions OP1–OPN. The sequence of circuit operations required to extinguish the lamp L in such a case is initiated when both relays D and CW are released and thereby operate relay R over the path from ground through the R relay winding and the contacts RS–2, CW–4 and D–5 to potential P–3. In operating, relay R operates relay D over the path from potential P8 through the D relay winding, contacts CW–5, R–4 and RS–3, diode DD, resistor R1 and contact R–3 to ground. Upon operating, relay D initiates the circuit operations described in the two immediately preceding paragraphs whereby the lamp L is extinguished and the circuits of FIG. 2 are prepared for a subsequent speed-of-service measurement.

In accordance with another aspect of my invention, if the speed-of-service is unchanged on successive measurements, the indication provided by lamp L is not changed and relay R is immediately operated over one of its previously described operate paths at the expiration of the timed interval. The circuit actions that follow the operation of relay RS for preparing the circuits of FIG. 2 for a subsequent speed-of-service measurement are explained in preceding paragraphs.

My invention also furnishes alarm circuitry which notifies the attendant when a trouble condition occurs which adversely affects the proper functioning of the circuits of FIG. 2 and the signals provided by lamp L. This circuitry is shown in the lower right side of FIG. 2 and comprises a service alarm lamp AL and relay AR. The latter relay is a slow acting device which is held normally operated over the path from ground through its winding, the one-only symmetric of contacts on relay D, F and S and the lamp AL to the negative potential P9. The current flowing through lamp AL at this time is limited by the resistance of the AR relay winding and is insufficient to cause its illumination. As described previously, relays R and RS operate only briefly while relays D, F and S are operated to control the energization of the lamp L to the state corresponding to a speed-of-service measurement. During this brief period when a discontinuity may take place through the one-only symmetric, the AR relay winding is shunted to ground via the contacts R–7 and RS–5 and the release alarm key RA. This shunting action, together with the slow-release characteristic of relay AR prevents the release of relay AR during the aforementioned brief switching period. If a trouble prevents the release of relay R or RS or both, relay AR releases after a time delay. When relay AR releases, it completes a path for lighting lamp AL and thereby informing the attendant of malfunction in the circuit of FIG. 2. This path is from potential P9 through lamp AL, contact AR–1 and the key RA to ground.

Apparatus is also provided in the alarm circuitry for checking that a dark signal is provided by lamp L when none of the trunk circuits TC00–TC94 is awaiting connections to the positions OP1–OPN. As mentioned previously, when the latter condition prevails, relay CW is released and if relay D is also released, a path is completed for operating relay D as previously explained. If relay D fails to be so operated, the lamp AL is illuminated by virtue of the circuit completed from potential P9 through lamp AL, contacts D–6, CW–6 and key RA to ground. This lamp signal notifies the attendant of a malfunction in the circuits of FIG. 2.

It is to be understood that the above-described arrangements are illustrative of the application of the principles of my invention. Numerous other arrangements may be devised by those skilled in the art without departing from the spirit and scope of the invention.

What is claimed is:

1. In combination, control means operable for controlling the interconnection of calling circuits with operator positions, means for generating a timed interval, means responsive to each operation of said control means for measuring the speed with which calling circuits are interconnected with operator positions within said interval, and means activated by said measuring means for supplying a distinct signal corresponding to the measured speed.

2. In combination, apparatus operable for gating the interconnection of calling circuits with operator positions, means for generating a timed interval, means for counting each operation of said apparatus within said interval, indicator means operable to provide a plurality of indications each of which corresponds to both a distinct service speed and predetermined numbers of said apparatus opertaions, and control means activated by said counting means at the end of said interval for operating said indicator means to provide one of said indications.

3. The combination in accordance with claim 2 further comprising means responsive to the activation of said control means for checking that said indicator means is energized only to said state which corresponds to said counted number.

4. The combination in accordance with claim 2 wherein said generating means comprises means for commencing the generation of a timed interval when a calling circuit is awaiting interconnections with an operation position and means for arresting the generation of a timed interval after all calling circuits have been interconnected with operator positions, and further comprising means controllable by said arresting means for operating said indicator means to a state corresponding to another service speed.

5. The combination in accordance with claim 2 wherein said indicator means comprises a lamp and said control means comprises both means for operating said lamp to a flashing state and means for operating said lamp to a steadily lighted state.

6. An operator speed-of-service circuit comprising a counter for counting the number of times that calling circuits are admitted into a switching network for connection to operator positions, means activated by said counter for registering the counted numbers, a timer for generating a timed interval and comprising means for commencing the generation of said interval when a calling circuit is admitted into said network and means for signifying the end of said interval, an indicator lamp operable to provide a plurality of different illumination states each of which corresponds to a distinct operator speed-of-service, and control means activated by said register means and said signifying means at the end of said interval for operating said lamp to one of said states in accordance with the registered number of calling circuit admissions.

7. An operator speed-of-service circuit in accordance with claim 6 wherein said control means comprises an interrupter connectable to said lamp for lighting said lamp at a flashing rate, a first device operable under control of said signifying means at the end of said interval for connecting said interrupter to said lamp, a second device operable under joint control of said signifying means and said register means at the end of said interval for steadily lighting said lamp, and another device operative under joint control of said signifying means and said register means at the end of said interval for placing said lamp in its dark state.

8. An operator speed-of-service circuit in accordance with claim 7 wherein each of said devices comprises a relay having a coded array of contacts for checking that said lamp is selectively operated at the end of said interval to a predetermined one of said dark, flashing and steadily lighted states which corresponds to the registered number of calling circuit admissions.

9. An operator speed-of-service circuit in accordance with claim 7 further comprising alarm means activated by other contacts of said relays for furnishing an alarm signal upon the occurrence of a trouble condition in said control means and timer.

10. In a telephone system having a plurality of calling circuits, operator positions, a switching network for interconnecting said circuits and said positions and gating means operable for controlling the admission of said circuits into said network for interconnection with said positions, equipment for measuring and indicating the speed with which said circuits are interconnected with said positions and comprising means in said gating means for supplying a pulse signal for each operation of said gating means, means responsive to said pulses for counting the number of calling circuit admissions to said network, a first register relay activated by said counting means for registering a first counted number, a second register relay activated by said counting means for registering a second counted number, a timer for generating a timed interval and including means controlled by said gating means for commencing the generation of said interval when one of said circuits is admitted to said network and a timer relay activated for signifying the end of said interval, a lamp operable to a plurality of different illumination states each of which corresponds to both a distinct speed of interconnection and predetermined counted numbers, and control means comprising an interrupter connectable to said lamp for lighting said lamp at a flashing rate, a first switching relay operable at the end of said interval under control of contacts of said timer relay for connecting said interrupter to said lamp, a second switching relay operable at the end of said interval under control of contacts of both said first register relay and timer relay for steadily lighting said lamp, and a third switching relay operable at the end of said interval under control of contacts of both said second register relay and timer relay for placing said lamp in its dark state.

11. In a telephone system in accordance with claim 10, the combination wherein said equipment further comprises alarm means including an alarm relay having an operable winding, an alarm lamp, a contact of said timer relay, a one-only contact symmetric of said switching relays and a voltage source connected in circuit for operating said alarm relay and extinguishing said alarm lamp in the absence of a trouble condition in said timer and control means, and means including a contact of said alarm relay effective upon the release of said alarm relay for energizing said alarm lamp.

12. In a telephone system in accordance with claim 10, the combination wherein said equipment further comprises means controlled by said gating means and a contact on said third switching relay for operating said timer relay when all of said calling circuits have been interconnected with said operator positions and means controlled by said gating means and contacts of said timer relay for operating said third switching relay following the last-mentioned operation of said timer relay.

13. In a telephone system in accordance with claim 11, the combination wherein said control means further comprises a one-only symmetric configuration of contacts of said switching relays for insuring that only one of said switching relays remains operated following the termination of said timed interval.

14. In a telephone system in accordance with claim 13, the combination further comprising a reset relay operative under the control of said one-only contact symmetric for resetting said timer and said counting means by releasing said timer relay and the operated ones of said register relays.

No references cited.

KATHLEEN H. CLAFFY, *Primary Examiner.*

H. ZELLER, *Assistant Examiner.*